(12) United States Patent
Konik et al.

(10) Patent No.: US 11,250,002 B2
(45) Date of Patent: *Feb. 15, 2022

(54) RESULT SET OUTPUT CRITERIA

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 395 days.

This patent is subject to a terminal disclaimer.

(21) Appl. No.: 16/516,289

(22) Filed: Jul. 19, 2019

(65) Prior Publication Data

US 2019/0340179 A1 Nov. 7, 2019

Related U.S. Application Data

(63) Continuation of application No. 15/200,072, filed on Jul. 1, 2016, now Pat. No. 10,558,668.

(51) Int. Cl.
*G06F 16/20* (2019.01)
*G06F 16/2455* (2019.01)

(52) U.S. Cl.
CPC .............. *G06F 16/24554* (2019.01)

(58) Field of Classification Search
None
See application file for complete search history.

(56) References Cited

U.S. PATENT DOCUMENTS

| | | |
|---|---|---|
| 6,856,996 B2 | 2/2005 | Chow et al. |
| 8,209,280 B2 | 6/2012 | Kearney et al. |
| 8,417,693 B2 | 4/2013 | Lempel et al. |
| 8,799,311 B2 | 8/2014 | Powell et al. |
| 8,938,442 B2 | 1/2015 | Zelek et al. |
| 9,195,698 B2 | 11/2015 | Fuller et al. |
| 2014/0032590 A1 | 1/2014 | Sinclair et al. |
| 2014/0067796 A1 | 3/2014 | White |

(Continued)

FOREIGN PATENT DOCUMENTS

WO 2015152868 A1 10/2015

OTHER PUBLICATIONS

Hall, "Row Limiting Clause for Top-N Queries in Oracle Database 12c Release 1 (12.1)", https://oracle-base.com/articles/12c/row-limiting-clause-for-top-n-queries-12cr1. Last accessed Apr. 5, 2016, 9:54 AM. 9 pages.

(Continued)

*Primary Examiner* — Kristopher Andersen
(74) *Attorney, Agent, or Firm* — Stosch S. Sabo

(57) ABSTRACT

A structured query language (SQL) query is configured to present a selected portion of a result set to a user interface. The selected portion of the result set can be based on an offset criteria appended to the SQL query. The offset criteria determines a location of a first presented instance of the selected portion of the result set. The offset criteria is configured to determine the location of the first presented instance of the selected portion of the result set independent of a number of instances appearing between a first instance of the result set and the first presented instance of the selected portion of the result set.

20 Claims, 8 Drawing Sheets

(56) References Cited

U.S. PATENT DOCUMENTS

| | | |
|---|---|---|
| 2014/0222787 A1 | 8/2014 | Xu et al. |
| 2016/0012155 A1 | 1/2016 | Shivarudraiah et al. |
| 2016/0063107 A1 | 3/2016 | Schukovets et al. |
| 2016/0117363 A1 | 4/2016 | Aguilera et al. |
| 2016/0140166 A1 | 5/2016 | Schechter et al. |
| 2017/0242884 A1 | 8/2017 | Liu et al. |
| 2018/0004814 A1 | 1/2018 | Konik et al. |

OTHER PUBLICATIONS

Hellstrom, "Top-N Queries and Pagination", http://oracle.readthedocs.io/en/latest/sql/indexes/top-n-pagination.html Last accessed Apr. 5, 2016, 9:56 AM. 2 pages.

Kruglej, "Top-N Queries & The New Row Limiting Clause 11g & 12c", Nov. 2013. 10 pages.

Mullins, "Powerful Oracle 12c SQL Features", Themis, Inc. 32 pages.

Troels, "Comparison of different SQL implementations", http://troels.arvin.dk/db/rdbms/#select-limit-offset Page last updated Dec. 2, 2014. Last accessed Apr. 5, 2016, 9:58 AM. 45 pages.

Unknown, "What is a query offset?", Stack Overflow, http://stackoverflow.com/questions/1197603/what-is-a-query-offset Last accessed Apr. 5, 2016, 9:51 AM. 2 pages.

Unknown, "The art of pagination—Offset vs. value based paging", Technical Services, Dec. 20, 2013. http://blog.novatec-gmbh.de/art-pagination-offset-vs-value-based-paging/ Last accessed Apr. 5, 2016, 9:52 AM. 8 pages.

Unknown, "Offset Fetch Clause (SQL Server Compact", Microsoft, https://technet.microsoft.com/en-us/library/gg699618. Last accessed Apr. 5, 2016, 10:33 AM. 1 page.

IBM, List of IBM Patents or Patent Applications Treated as Related, Jul. 18, 2019, 2 pages.

FIG. 7D

| INSTANCE | FIRST NAME | LAST NAME |
|---|---|---|
| 13 | MONA | FRIEDENS |
| 14 | NEIL | BELFONTAINE |
| 15 | OBSA | SORANS |
| 16 | PENNY | MCCORMICK |
| 17 | QUENTIN | CARRY |
| 18 | REESE | IBERS |
| 19 | SASHA | MARKS |
| 20 | TRACY | EDWARDS |
| 21 | TONYA | MARSH |
| 22 | VANCE | SIMS |
| 23 | WARREN | MALIK |
| 24 | WAKE | DRIEBERS |
| 25 | YOLANDA | PIERCE |
| 26 | ZACH | PETERSON |

FIG. 7E

| INSTANCE | FIRST NAME | LAST NAME |
|---|---|---|
| 22 | VANCE | SIMS |
| 23 | WARREN | MALIK |
| 24 | WAKE | DRIEBERS |
| 25 | YOLANDA | PIERCE |
| 26 | ZACH | PETERSON |

FIG. 7C

| INSTANCE | FIRST NAME | LAST NAME |
|---|---|---|
| 4 | DON | JOHNSON |
| 5 | ED | SIMPSON |
| 6 | FRED | JOHNSON |
| 7 | GARY | GIROUX |
| 8 | HANNAH | LORAINE |
| 9 | INGRID | HARRISON |
| 10 | JANICE | REINGOLD |
| 11 | KEVIN | PARSONS |
| 12 | LARRY | ALBERTS |
| 13 | MONA | FRIEDENS |
| 14 | NEIL | BELFONTAINE |
| 15 | OBSA | SORANS |
| 16 | PENNY | MCCORMICK |
| 17 | QUENTIN | CARRY |
| 18 | REESE | IBERS |
| 19 | SASHA | MARKS |
| 20 | TRACY | EDWARDS |
| 21 | TONYA | MARSH |
| 22 | VANCE | SIMS |
| 23 | WARREN | MALIK |
| 24 | WAKE | DRIEBERS |
| 25 | YOLANDA | PIERCE |
| 26 | ZACH | PETERSON |

RESULT SET OUTPUT CRITERIA

BACKGROUND

The present disclosure relates to structured query language (SQL), and, more specifically, to presenting a selected portion of a result set generated by a SQL query.

SQL queries can contain clauses configured to present a portion of a result set such as an OFFSET clause and a FETCH clause. An OFFSET clause can cause a SQL query to present a portion of a result set starting with an initial instance specified by a number of instances after a first instance of the result set. For example, an OFFSET clause can be configured to present a $100^{th}$ instance of a result set as the initial result in a portion of the result set output to an interface.

A FETCH clause can cause a SQL query to present a selected number of instances of the result set. For example, a FETCH clause can be configured to present 100 instances of a result set to an interface. An OFFSET clause can be used in combination with a FETCH clause to present a selected portion of the result set. For example, an OFFSET clause configured to present a portion of the result set beginning at the $100^{th}$ instance of the result set in combination with a FETCH clause configured to present 100 instances of the result set will present instances 100-200 of the result set on an interface.

SUMMARY

Aspects of the present disclosure are directed to a method comprising modifying a structured query language (SQL) query to include an offset criteria comprising a first set of text. The method can further comprise executing the modified SQL query such that a result set comprising a first number of instances is retrieved from a database. The method can further comprise outputting a portion of the result set to a user interface based on the offset criteria and in response to executing the modified SQL query. The portion of the result set can comprise an initial instance and a terminal instance and each respective instance of the result set located between the initial instance and the terminal instance. Furthermore, the portion of the result set can comprise a second number of instances being less than the first number of instances. Further still, the initial instance of the portion of the result set can contain a set of text matching the first set of text of the offset criteria.

Further aspects of the present disclosure are directed to a system comprising a user device, a memory storing a database therein, and a processor communicatively coupled to the user device and the memory. The processor can be configured to receive, from the user device, a structured query language (SQL) query configured to retrieve a plurality of values from the database according to a selection criteria. The processor can be further configured to receive an offset criteria comprising a first set of text from the user device. The processor can be further configured to modify the SQL query to include the offset criteria in the SQL query by appending an OFFSET clause containing the offset criteria to the SQL query. The processor can be further configured to execute the SQL query on the database and generate a result set. The processor can be further configured to locate a first value in a first instance of the result set matching the first set of text and output, to the user device, a first portion of the result set comprising the first instance and each respective instance of the result set located between the first instance and a second instance located at the end of the first portion of the result set.

Further aspects of the present disclosure are directed to a computer program product comprising a computer readable storage medium having program instructions embodied therewith. The computer readable storage medium is not a transitory signal per se. The program instructions can be executed by a processor to cause the processor to perform a method comprising receiving a result set corresponding to a structured query language (SQL) query, where the result set comprises a plurality of instances, and where each respective instance is associated with one or more respective values. The program instructions can cause the processor to perform a method further comprising defining a first portion of the result set to output to an interface based on the SQL query, where the first portion of the result set comprises a first initial instance, a first terminal instance, and each respective instance located between the first initial instance and the first terminal instance of the result set. Defining the first portion of the result set can further comprise identifying the first initial instance of the result set according to an offset criteria specified in an OFFSET clause of the SQL query, where the offset criteria is configured to identify the first initial instance independent of a number of instances appearing between a first instance of the result set and the first initial instance of the first portion of the result set. Defining the first portion of the result set further comprises identifying the first terminal instance of the result set according to a fetch criteria specified in a FETCH clause of the SQL query, and outputting the first portion of the result set to the interface.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7C illustrates a table of an example portion of the result set of FIG. 7B presented according to a selection predicate criteria in accordance with some embodiments of the present disclosure.

FIG. 7D illustrates a table of an example portion of the result set of FIG. 7B presented according to a percentage criteria in accordance with some embodiments of the present disclosure.

FIG. 7E illustrates a table of an example portion of the result set of FIG. 7B presented according to a user-defined function (UDF) criteria in accordance with some embodiments of the present disclosure.

Figure 1:
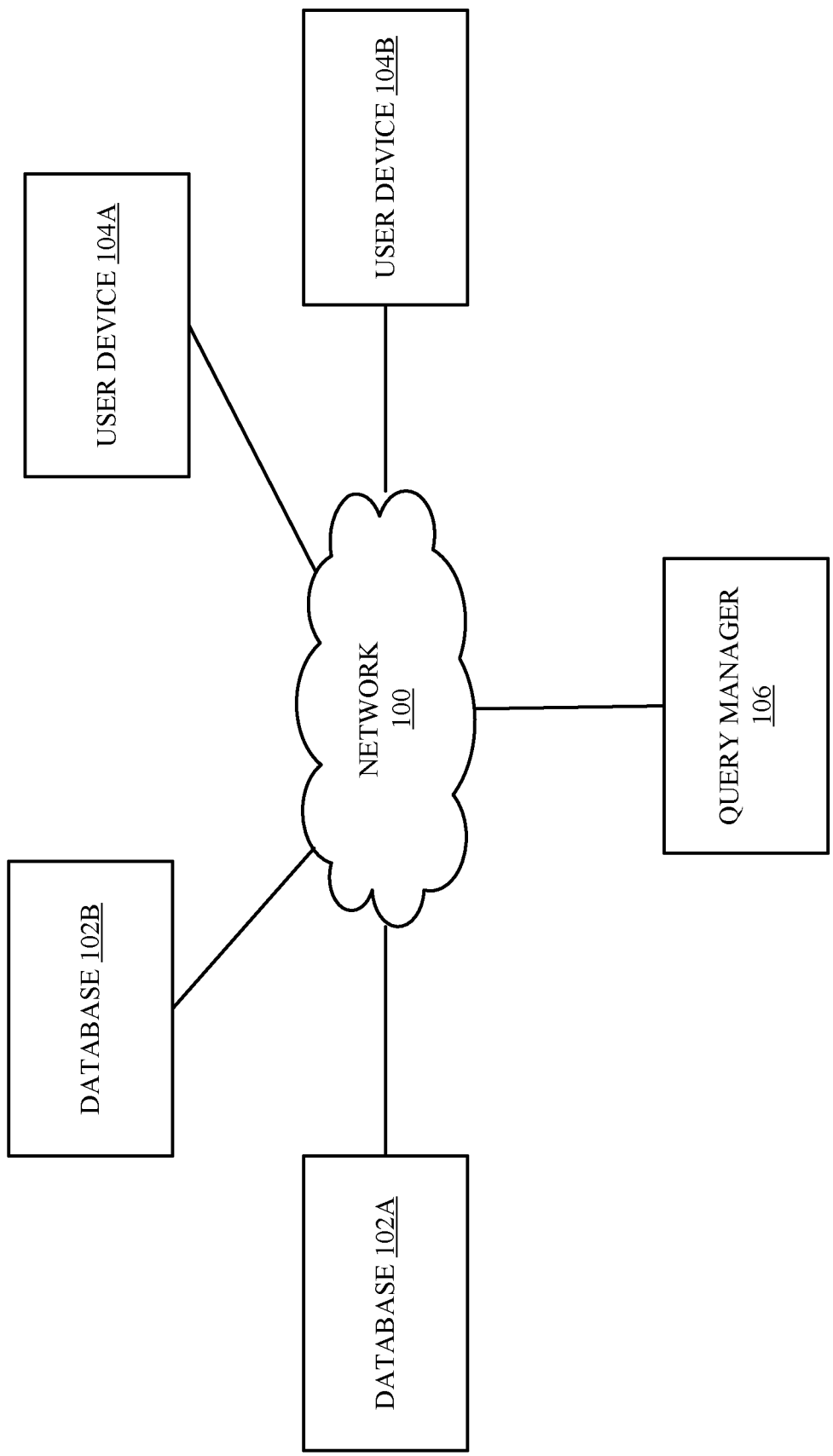
FIG. 1 illustrates a block diagram of a network in which some embodiments of the present disclosure can be implemented.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to presenting a selected portion of a result set generated by a SQL query using an offset criteria and, in some embodiments, a fetch criteria. In accordance with embodiments of the present disclosure, the offset criteria can be defined using an OFFSET clause configured to indicate an initial instance of the result set to be presented based on a selection predicate criteria (e.g., a first row containing the last name "Johnson" in a result set), a percentage criteria (e.g., a $50^{th}$ percentile of the result set), or a user defined function (UDF) criteria (e.g., a location in the result set based on a User Profile "A") Likewise, the fetch criteria can be defined using a FETCH clause configured to indicate a terminal instance of the result set to be presented based on a numeric criteria (e.g., 100 instances following the initial instance), a selection predicate criteria (e.g., a first instance following the initial instance containing a last name "Anderson"), a percentage criteria (e.g., a percentage of a number of instances in the result set following the initial instance), or a UDF criteria (e.g., a criteria retrieved from metadata associated with a user profile). As is understood by one of skill in the art, the OFFSET clause and the FETCH clause can be appended to a SQL query. The offset criteria and the fetch criteria can be defined by an input (e.g., a user selection), retrieved from metadata (e.g., from user profile information), or automatically generated (e.g., predicted by machine learning). In some embodiments, the SQL query is further configured to improve performance (e.g., processing speed) of presenting the portion of the result set to an interface.

Advantageously, aspects of the present disclosure enable presentation of a selected portion of a result set using a criteria other than, or in addition to, a numeric criteria. Specifically, aspects of the present disclosure enable presentation of a selected portion of a result set having an initial instance defined by an offset criteria comprising a selection predicate criteria, a percentage criteria, or a UDF criteria. In some embodiments, the selected portion of the result set is further defined by a fetch criteria comprising a numeric criteria, a selection predicate criteria, a percentage criteria, or a UDF criteria. Thus, in accordance with some embodiments of the present disclosure, SQL queries can be configured to consistently present a desired portion of a result set retrieved from a database despite changes to the database. For example, a user may wish to see a portion of a result set beginning with an instance containing the last name "Johnson". During a first generation of the result set, the last name "Johnson" may first appear at an instance 99 of the result set. During a second generation of the result set, the last name "Johnson" may first appear at instance 105 of the result set as a result of modifications made to the database from which the result set is retrieved. Thus, it can be advantageous to present a portion of the result set according to a selection predicate criteria comprising "Johnson" as opposed to a numeric criteria comprising "99". Furthermore, some embodiments of the present disclosure improve performance (e.g., faster processing speed) and presentation (e.g., intuitive output of results) associated with retrieving and outputting a portion of a result set. It is to be understood that the aforementioned advantages are example advantages and various embodiments of the present disclosure can contain all, some, or none of the aforementioned advantages while remaining within the spirit and scope of the present disclosure.

Referring now to the figures, FIG. 1 illustrates a block diagram of a network in which some embodiments of the present disclosure can be implemented. The network 100 can comprise a physical or virtual network configured to communicatively couple a plurality of devices to one another. The network 100 can be communicatively coupled to one or more user devices 104A and 104B (referred to collectively herein as user device 104). User device 104 can comprise a computer workstation, a laptop, a mobile device, or an application operating on a user device. In various embodiments, the user device 104 can generate SQL queries, receive offset criteria, receive fetch criteria, execute SQL queries, and/or present a portion of a result set of an executed SQL query.

The network 100 can be communicatively coupled to a query manager 106. The query manager 106 can receive an original SQL query from a user device 104 via the network 100. The query manager 106 can be configured to modify the original SQL query to a modified SQL query. In some embodiments, the modified SQL query contains an OFFSET clause having an offset criteria stored therein. In some embodiments, the modified SQL query contains a FETCH clause having a fetch criteria stored therein. The modified SQL query is described in further detail hereinafter with respect to operation 330 of FIG. 3 and FIG. 4.

In some embodiments, the query manager 106 is further configured to improve the modified SQL query to create an improved modified SQL query. The improved modified SQL query can process the result set and/or process a portion of the result set presented to an interface more efficiently than the modified SQL query. The improved modified SQL query can be configured to, for example, generate an index for the result set, partition the result set into a plurality of partitions, execute one or more sub-queries on the result set, and/or re-order an execution sequence of the modified SQL query, among other improvements. The improved modified SQL query is described in further detail hereinafter with respect to operation 440 of FIG. 4.

Query manager 106 can execute modified SQL queries against one or more databases 102A and 102B (hereinafter referred to collectively as database 102) via the network 100. Database 102 can comprise a database containing a plurality of respective instances where each respective instance stores a respective set of data therein. Each respective set of data can comprise one or more respective values. In some embodiments, database 102 can be, for example, a DB2 database.

Figure 2:
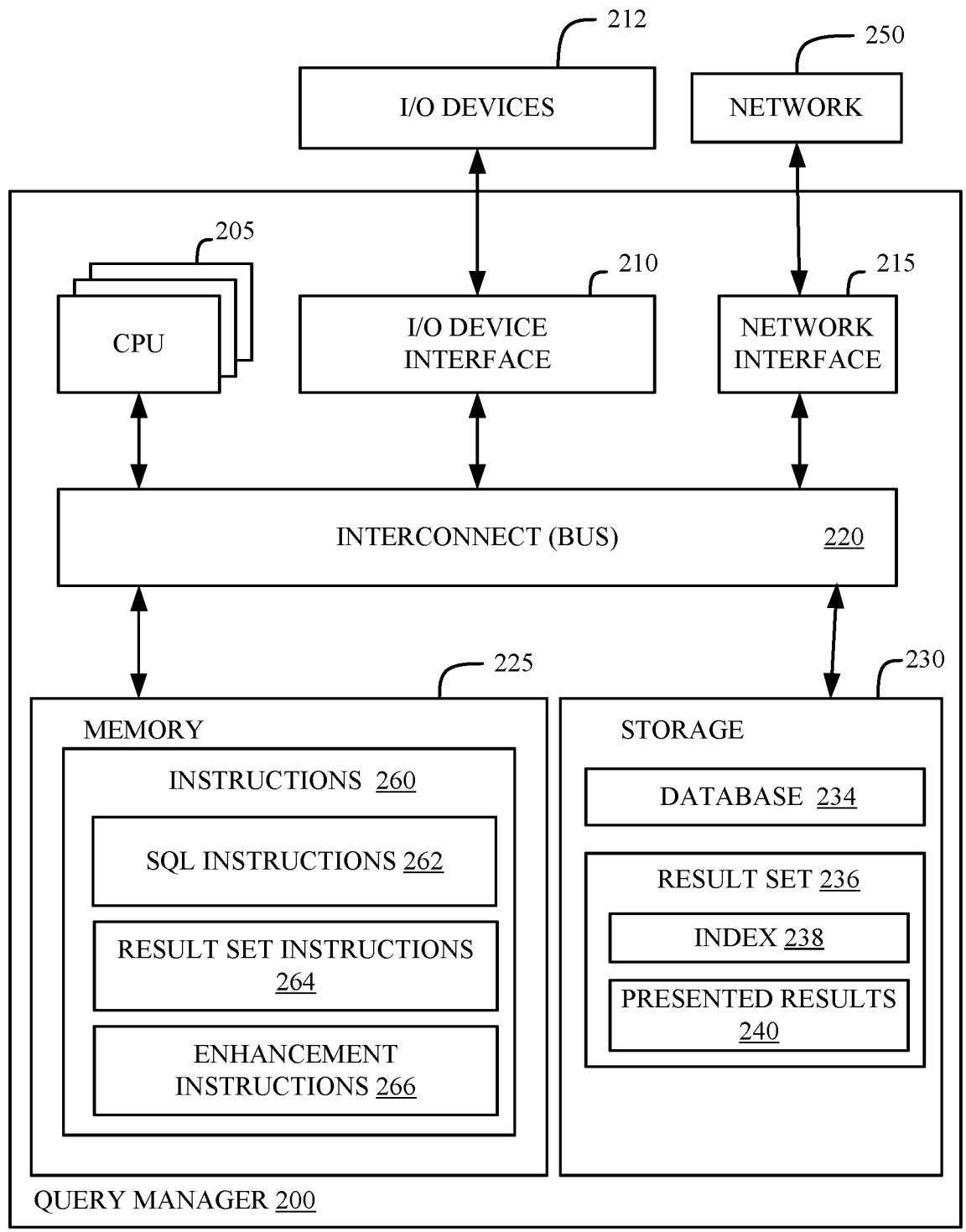
FIG. 2 illustrates a block diagram of a query manager capable of executing some embodiments of the present disclosure.

Referring now to FIG. 2, illustrated is a block diagram of a query manager in accordance with some embodiments of the present disclosure. In some embodiments, the query manager 200 can be consistent with query manager 106 of FIG. 1. The query manager 200 can include a memory 225, storage 230, an interconnect (e.g., BUS) 220, one or more processors 205 (also referred to as CPU 205 herein), an I/O device interface 210, I/O devices 212, and a network interface 215.

Each CPU 205 retrieves and executes programming instructions stored in the memory 225 or storage 230. The interconnect 220 is used to move data, such as programming instructions, between the CPU 205, I/O device interface 210, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the query manager 200 via the I/O devices 212 or a communication network 250 via the network interface 215.

In some embodiments, the memory 225 stores instructions 260 and the storage 230 stores database 234 and result set 236. However, in various embodiments, the instructions 260, the database 234, and the result set 236 are stored partially in memory 225 and partially in storage 230, or they are stored entirely in memory 225 or entirely in storage 230, or they are accessed over a network 250 via the network interface 215.

Storage 230 contains database 234. Database 234 can contain a plurality of respective instances storing respective sets of data therein. Respective sets of data can comprise one or more respective values. In some embodiments, the database 234 is consistent with database 102 of FIG. 1.

Storage 230 further contains a result set 236 comprising a set of instances retrieved from database 234 as a result of an executed SQL query. In some embodiments, result set 236 contains an index 238 containing an instance identifier for each respective instance of the result set 236 and at least one respective value of each respective set of data associated with each respective instance of the result set 236. In various embodiments, the generated index can include, but is not limited to, a bitmap index, a dense index, a sparse index, or a reverse index. As will be appreciated by one of skill in the art, numerous types of indices generated by numerous techniques fall within the spirit and scope of the present disclosure. Index 238 is described in further detail hereinafter with respect to FIG. 5.

Result set 236 further contains presented results 240 comprising a subset of the result set 236. Presented results 240 can be a subset of result set 236 as defined by an OFFSET clause containing offset criteria and, in some embodiments, also by a FETCH clause containing fetch criteria. Presented results 240 can comprise an initial instance based on the offset criteria, a terminal instance based on the fetch criteria, and each respective instance located between the initial instance and the terminal instance.

The instructions 260 store processor executable instructions for various methods such as the method shown and described hereinafter with respect to FIG. 3-6. The instructions can include SQL instructions 262, result set instructions 264, and enhancement instructions 266. SQL instructions 262 store processor executable instructions for generating and/or executing one or more SQL queries against one or more databases.

Result set instructions 264 store processor executable instructions for selecting a portion of a result set to be presented on an interface (e.g., I/O devices 212). Result set instructions 264 further store processor executable instructions for appending an OFFSET clause storing offset criteria therein to an original SQL query. In some embodiments, result set instructions 264 can be configured to cause a processor to append a FETCH clause storing fetch criteria therein to an original SQL query.

Enhancement instructions 266 store processor executable instructions for improving performance of executing a SQL query and/or for improving performance of presenting a selected portion of a result set. In some embodiments, enhancement instructions 266 are configured to cause a processor to generate index 238. In some embodiments, enhancement instructions 266 are configured to cause a processor to replace an offset criteria with a sub-query configured to locate the offset criteria in a result set. In some embodiments, enhancement instructions 266 are configured to cause a processor to replace fetch criteria with a sub-query configured to locate the fetch criteria in a result set. In some embodiments, enhancement instructions 266 are configured to cause a processor to partition a result set into a plurality of partitions where the majority of the plurality of partitions contain an equal number of instances therein. The enhancement instructions 266 can be further configured to simultaneously execute a sub-query on the plurality of partitions. Enhancement instructions 266 are described in further detail hereinafter with respect to operation 330 of FIG. 3 and operation 440 of FIG. 4.

In various embodiments, the I/O devices 212 can include an interface capable of presenting information and receiving input. In some embodiments, I/O devices 212 are consistent with user device 104 of FIG. 1. I/O devices 212 can be configured to generate a SQL query, execute a SQL query, receive offset criteria, receive fetch criteria, and/or present a portion of a result set in accordance with various embodiments.

In some embodiments, the network 250 is consistent with network 100 of FIG. 1. The network 250 can connect the query manager 200 with additional databases 234 and/or additional instructions 260.

Figure 3:
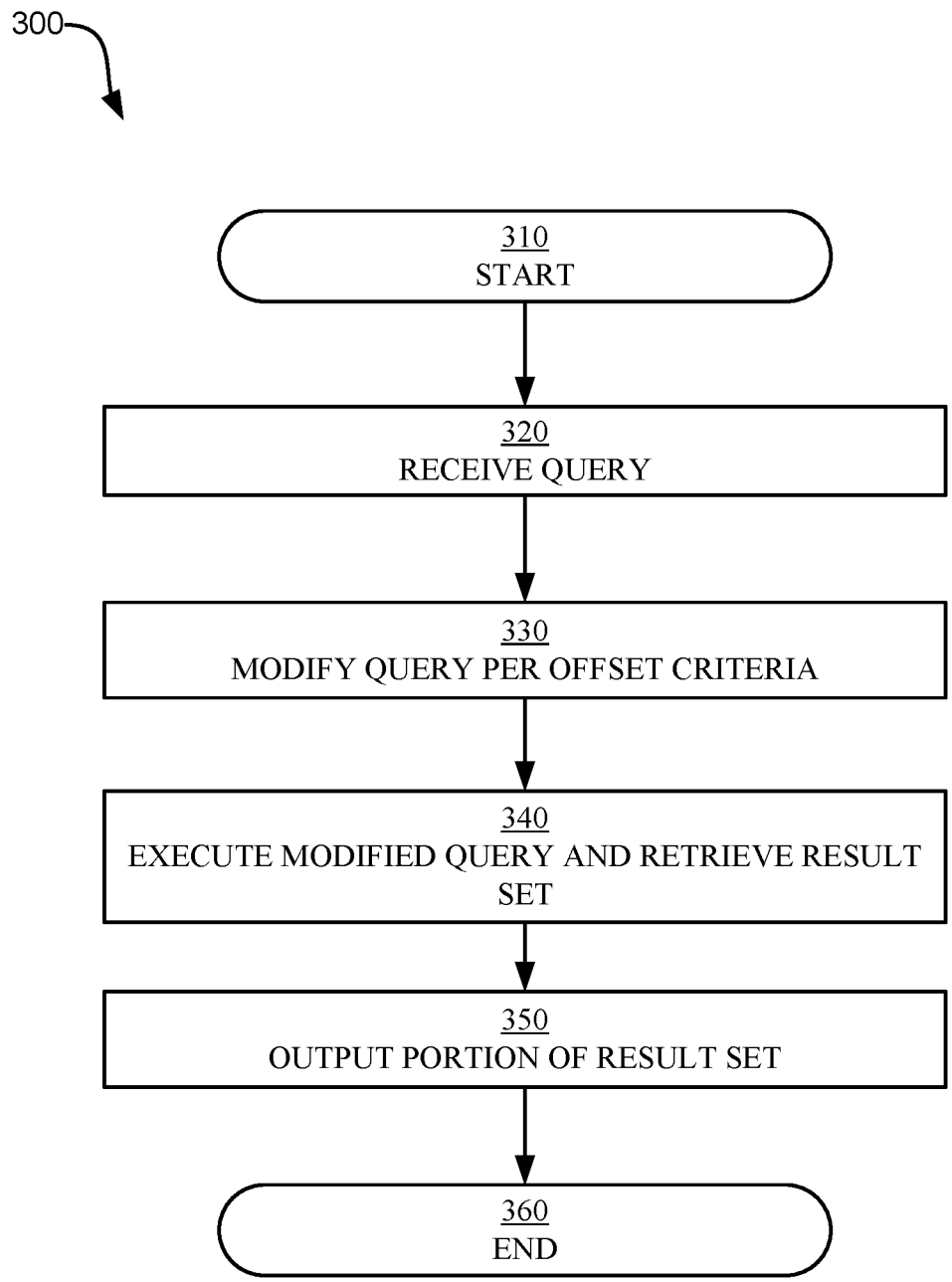
FIG. 3 illustrates a flowchart of an example method for outputting a selected portion of a result set in accordance with some embodiments of the present disclosure.

Referring now to FIG. 3, illustrated is a flowchart of an example method for presenting a portion of a result set in accordance with some embodiments of the present disclosure. In some embodiments, the method 300 can be executed by one or more processors (e.g., processor 205 of FIG. 2) executing a set of instructions (e.g., instructions 260 of FIG. 2). In some embodiments, the method 300 can be executed by a query manager in a network (e.g., query manager 106 connected to network 100 as shown and described with respect to FIG. 1).

The method 300 can start at operation 310. In operation 320, an original SQL query can be received. In some embodiments, the original SQL query is received from a user device (e.g., user device 104 of FIG. 1 or I/O devices 212 of FIG. 2) via a physical or virtual network (e.g., network 100 of FIG. 1 or network 250 of FIG. 2). The original SQL query can be configured to retrieve selected data from selected instances of a database and store the retrieved data in a result set.

In operation 330, the received SQL query can be modified to present a portion of a result set according to an offset criteria. The offset criteria defines an initial instance of the portion of the result set. The offset criteria can include, but is not limited to, a selection predicate criteria, a percentage criteria, or a UDF criteria. In some embodiments, the offset criteria is received as a result of a user input comprising, for example, a set of text (e.g., in the case of a selection predicate criteria) or a number (e.g., in the case of a percentage criteria). In some embodiments, the offset criteria can be retrieved from metadata associated with a user or with a profile associated with the user (e.g., in the case of a UDF criteria). The offset criteria can be stored in an OFFSET clause appended to the received SQL query.

In some embodiments, the portion of the result set is further defined by a fetch criteria. The fetch criteria can define a terminal instance of the portion of the result set using a numeric criteria, a selection predicate criteria, a percentage criteria, or a UDF criteria. The fetch criteria can be received as a result of user input or retrieved from, for example, metadata associated with a user. The fetch criteria can be stored in a FETCH clause appended to the received SQL query.

In a case where the offset criteria comprises a numeric criteria, the numeric criteria can be configured to cause the SQL query to present results of the SQL query beginning at a position in the result set corresponding to the numeric criteria. For example, Table 1 illustrates a modified SQL query where the offset criteria comprises a numeric criteria:

TABLE 1

Example Modified SQL Query Having an Offset Criteria Comprising a Numeric Criteria SELECT First_Name ,Last_Name
FROM Employees
WHERE <some-criteria>
ORDER BY First Name OFFSET 1000 ROWS
FETCH NEXT 100 ROWS ONLY Table 1 illustrates an example modified SQL query containing an offset criteria comprising a numeric criteria. When executed, the example modified SQL query shown in Table 1 retrieves names from an employee database and orders the retrieved names (i.e., the result set) by the first names of the employees. Rows 1000-1100 are presented based on the 1000 row numeric offset criteria stored in the OFFSET clause and the 100 row numeric fetch criteria stored in the FETCH clause. In embodiments where fewer than 100 sequential instances remain in the result set, the FETCH clause is configured to present the remainder of the result set to the interface.

In embodiments where the offset criteria comprises a selection predicate criteria, the offset criteria can be configured to present a portion of the result set of the SQL query beginning at an instance of the result set matching the selection predicate criteria. For example, Table 2 illustrates a modified SQL query having an offset criteria comprising a selection predicate criteria:

TABLE 2

Example Modified SQL Query Having an Offset Criteria Comprising a Selection Predicate Criteria SELECT First_Name , Last_Name
FROM Employees
WHERE <some-criteria>
ORDER BY First_Name OFFSET StartAt(Last_Name='Johnson')
ROWS
FETCH NEXT 100 ROWS ONLY Table 2 illustrates an example modified SQL query containing an offset criteria defined by a selection predicate criteria indicated by the StartAt clause. When executed, the example modified SQL query shown in Table 2 retrieves names from an employee database and orders the retrieved names (i.e., the result set) by the first names of the employees. The offset criteria contained in the OFFSET clause is configured to present a portion of the result set beginning at an initial instance containing a first appearance of the last name "Johnson" as specified in the StartAt clause. The fetch criteria contained in the FETCH clause is configured to present the instance identified by the StartAt clause and 100 sequential instances following the instance identified by the StartAt clause. In embodiments where fewer than 100 sequential instances remain in the result set, the FETCH clause is configured to present the remainder of the result set to the interface.

In some embodiments where the offset criteria comprises a selection predicate criteria, numerous GetNextBlock(x) functions can be executed and analyzed until the selection predicate criteria is satisfied. In such embodiments, a page up operation received from an interface can be executed by retrieving one or more sets of data from the plurality of GetNextBlock(x) functions. As is understood by one of skill in the art, a GetNextBlock(x) function can retrieve sequential sets of x instances from a result set (where x is a non-negative integer). Although a GetNextBlock(x) function is described here, one of skill in the art will recognize different functions or combinations of functions are possible while remaining within the spirit and scope of the present disclosure.

In some additional embodiments where the offset criteria comprises a selection predicate criteria, an index (e.g., index 238 of FIG. 2) can be built based on the result set in order to expediently locate the selection predicate criteria. The index can contain an instance identifier and at least one value associated with each respective instance. The generated index can include, but is not limited to, a bitmap index, a dense index, a sparse index, or a reverse index. One of skill in the art will recognize numerous types of indices generated by numerous techniques are within the spirit and scope of the present disclosure.

In some further embodiments where the offset criteria comprises a selection predicate criteria, a sub-query can be executed to locate an instance of the result set corresponding to the selection predicate criteria. For example, a sub-query can be embedded in an OFFSET clause and configured to locate an appearance of "Johnson" in the result set. The sub-query can determine that the first appearance of Johnson occurs at a row x (where x is a non-negative variable integer). The sub-query can supply the row x information to the OFFSET clause such that the OFFSET clause is configured to offset the result set according to the row number (e.g., "x") corresponding to the selection predicate criteria (e.g., "Johnson") as opposed to using the selection predicate criteria directly (e.g., "Johnson"). One of skill in the art will recognize that numerous types of sub-queries configurable to locate a desired criteria within a result set are within the spirit and scope of the present disclosure.

In embodiments where the received SQL query is modified using a percentage criteria, the percentage criteria can be configured to present results beginning at a selected percentile of the result set. For example, Table 3 illustrates an example modified SQL query containing a percentage criteria:

TABLE 3

Example Modified SQL Query Having an Offset
Criteria Comprising a Percentage Criteria

```
SELECT First_Name , Last_Name
FROM Employees
WHERE <some-criteria>
ORDER BY First_Name OFFSET 50% ROWS
FETCH NEXT 100 ROWS ONLY
```

Table 3 illustrates an example modified SQL query containing an offset criteria comprising a percentage criteria. When executed, the example modified SQL query shown in Table 3 retrieves names from an employee database and orders the retrieved names (i.e., the result set) by the first names of the employees. The offset criteria contained in the OFFSET clause is configured to present results beginning at an instance corresponding to an instance located at the $50^{th}$ percentile of the result set. The fetch criteria contained in the FETCH clause is configured to present the instance identified by the offset criteria and 100 sequential instances following the instance identified by the offset criteria to an interface. In embodiments where fewer than 100 sequential instances remain in the result set, the FETCH clause is configured to present the remainder of the result set to the interface.

In embodiments where the received SQL query is modified using a UDF criteria, the UDF criteria can be configured to present results beginning at a selected offset determined by the UDF criteria. For example, Table 4 illustrates an example modified SQL query containing a UDF criteria:

TABLE 4

Example Modified SQL Query Having an Offset
Criteria Comprising a UDF Criteria

```
SELECT First_Name , Last_Name
FROM Employees
WHERE <some-criteria>
ORDER BY First Name OFFSET UDF_Start(CURRENT_USER)
ROWS
FETCH NEXT 100 ROWS ONLY
```

Table 4 illustrates an example modified SQL query containing an offset criteria defined by a UDF criteria. When executed, the example modified SQL query shown in Table 4 retrieves names from an employee database and orders the retrieved names (i.e., the result set) by the first names of the employees. The offset criteria contained in the OFFSET clause is configured to present results beginning at an instance corresponding to an instance defined by the CURRENT_USER metadata retrieved by the UDF_Start clause. The fetch criteria contained in the FETCH clause is configured to present the instance identified by the offset criteria and 100 sequential instances following the instance identified by the offset criteria to an interface. In embodiments where fewer than 100 sequential instances remain in the result set, the FETCH clause is configured to present the remainder of the result set to the interface.

For example, an engineer (i.e., an example user) queries a database of mechanical fasteners to select an appropriate fastener. The engineer has a user profile indicating the engineer is a member of a design team dedicated to a respective customer. The respective customer has requirements regarding mechanical fasteners such as, for example, approved suppliers, industry-standard test qualifications, and so on. The UDF criteria retrieved from the user profile is configured to offset the results to start at, for example, an approved supplier of the mechanical fasteners for the respective customer. The aforementioned example is for illustrative purposes only and is not intended to limit the spirit and scope of the present disclosure. One of skill in the art will recognize that various types of metadata retrieved from various sources will be applicable to various applications implementing aspects of the present disclosure.

Although a fetch criteria comprises a numeric criteria in the examples shown and described in Tables 1-4, the fetch criteria can also comprise a selection predicate criteria, a percentage criteria, or a UDF criteria. In embodiments where the fetch criteria comprises a selection predicate criteria, the selection predicate criteria can define a terminal instance of the portion of the result set by identifying a value associated with an instance occurring after the initial instance of the portion of the result set where the value matches a set of text contained in the fetch criteria comprising a selection predicate criteria.

In embodiments where the fetch criteria comprises a percentage criteria, the percentage criteria can define a terminal instance of the portion of the result set by identifying an instance corresponding to a percentile of the remaining instances following the initial instance of the portion of the result set. Thus, in embodiments where the fetch criteria comprises a percentage criteria, a remaining size of the result set is determined by subtracting an initial instance number from the number of instances in the result set. Subsequently, a relative terminal instance number is generated by multiplying the percentage criteria by the remaining size of the result set. Finally, an absolute terminal instance number is generated by adding the relative terminal instance number to the initial instance number.

In embodiments where the fetch criteria comprises a UDF criteria, the UDF criteria can define a terminal instance of the portion of the result set by retrieving metadata from a user profile associated with the SQL query and using the retrieved metadata to identify the terminal instance of the portion of the result set.

In operation 340, the query modified in operation 330 can be executed. Execution of the query can comprise retrieving data according to the modified SQL query from a database. Operation 340 can generate a result set comprising a plurality of instances where each respective instance is associated with a respective set of data.

In operation 350, a portion of the result set defined by an offset criteria, and, in some embodiments, a fetch criteria, is output to a user interface (e.g., user device 104 of FIG. 1 or I/O devices 212 of FIG. 2) and/or a computer readable storage medium (e.g., memory 225 or storage 230 of FIG. 2). In some embodiments, the user can traverse portions of the result set that are not initially displayed by using a page up function or a page down function. For example, should a user care to view a portion of the result set preceding the portion presented on the interface, the user can page up to a desired portion of the result set. The page up functionality can be supported, for example, by a GetNextBlock(x) function, or by retrieving data from an index of the result set, or by other methods suitable for retrieving and presenting a different portion of the result set to the interface.

In some embodiments, the page up function retrieves a second portion of the result set in response to a request. The second portion of the result set can contain a number of instances equal to a number of instances presented in the first portion of the result set and can precede the first portion of the result set such that the initial instance of the first portion of the result set is sequential to a terminal instance of the second portion of the result set. Likewise, a page down function can retrieve a third portion of the result set having a number of instances equal to a number of instances of the first portion of the result set and sequential to the first portion of the result set such that an initial instance of the third portion of the result set is sequential to the terminal instance of the first portion of the result set. In operation 360, the method 300 can end.

Figure 4:
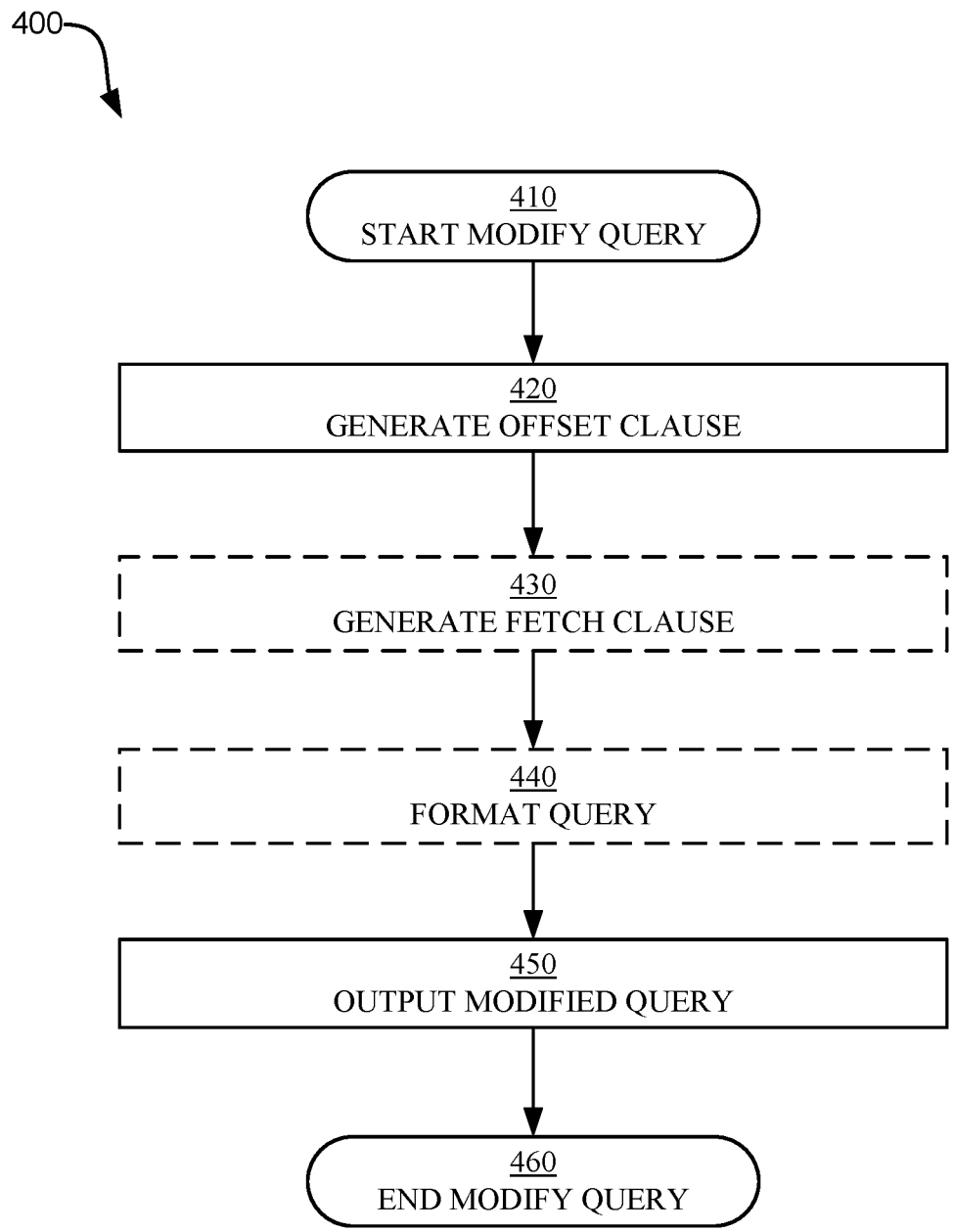
FIG. 4 illustrates a flowchart of an example method for modifying a query in accordance with some embodiments of the present disclosure.

Referring now to FIG. 4, shown is a flowchart illustrating an example method for modifying a SQL query. In some embodiments, the method 400 is a sub-method of operation 330 of FIG. 3. The method 400 can be implemented by one or more processors (e.g., processors 205 of FIG. 2) executing a set of instructions (e.g., instructions 260 of FIG. 2). In some embodiments, the method 400 can be implemented in a network (e.g., query manager 106 connected to network 100 of FIG. 1).

The method 400 can start at operation 410. In operation 420, an OFFSET clause can be generated containing an offset criteria. The offset criteria can comprise a selection predicate criteria, a percentage criteria, or a UDF criteria. The offset criteria can be received via an input (e.g., from user device 104 of FIG. 1 or I/O devices 212 of FIG. 2) or retrieved from metadata associated with the original SQL query. The generated OFFSET clause can be appended to the original SQL query.

In operation 430 (indicated as optional via the dashed lines), a FETCH clause can be generated containing a fetch criteria. The fetch criteria can comprise a numeric criteria, a selection predicate criteria, a percentage criteria, or a UDF criteria. The fetch criteria can be received via an input (e.g., from user device 104 of FIG. 1 or I/O devices 212 of FIG. 2) or retrieved from metadata associated with the original SQL query. The generated FETCH clause can be appended to the original SQL query. The original SQL query containing an OFFSET clause and, optionally, a FETCH clause can be referred to as a modified SQL query.

In operation 440 (indicated as optional via the dashed lines), the original SQL query containing the OFFSET clause, and, optionally, the FETCH clause can be formatted to improve the SQL query. Operation 440 can improve a modified SQL query to cause the improved modified SQL query to retrieve and present results in a shorter period of time compared to a modified SQL query. For example, various clauses in a modified SQL query can be rearranged to execute certain portions of the modified SQL query in an expeditious order. An example improved modified SQL query is shown with respect to Table 5.

TABLE 5

Example Improved Modified SQL Query for Efficient Execution

ORIGINAL QUERY:
SELECT <Columns>
FROM Employees
WHERE State='Minnesota'
ORDER BY State OFFSET StartAt(City_Name='Rochester') ROWS
IMPROVED QUERY:
SELECT <Columns>
FROM Employees
WHERE State='Minnesota' AND City_Name='Rochester'
Union ALL
SELECT <Columns>
FROM Employees
WHERE State='Minnesota' AND City_Name<>'Rochester'
ORDER BY State OFFSET StartAt(City_Name='Rochester') ROWS As can be seen in Table 5, the improved modified SQL query can separate the original query into two independent queries and combine the results of the two independent queries. The first query in the example improved modified SQL query can include retrieving values from an employee database where the state is Minnesota and the city is Rochester. The second query in the example improved modified SQL query can include retrieving values from an employee database where the state is Minnesota and the city is not Rochester. Thus, the result set generated by the original SQL query is identical to the combined result sets generated by the improved modified SQL query. However, the improved modified SQL query can return results the user wishes to view in a shorter amount of time. Specifically, the first portion of the improved modified SQL query does not need to sort and offset the result set, and, therefore, requires fewer resources (e.g., time and/or processing power) to return the result set.

In some embodiments, operation 440 improves the modified SQL query by configuring the modified SQL query to retrieve and display results in a manner conducive to user review and/or manipulation. For example, Table 6 illustrates an example modified SQL query and an improved modified SQL query configured to present results in an intuitive manner to enhance user review of the results:

TABLE 6

Example Improved Modified SQL Query for Intuitive Presentation of Query Results

ORIGINAL QUERY:
SELECT <Columns>
FROM Employees
WHERE State='Minnesota'
ORDER BY State OFFSET StartAt(City='Rochester') ROWS
IMPROVED QUERY:
SELECT <Columns>
FROM Employees
WHERE State='Minnesota'
ORDER BY State, City OFFSET StartAt(City='Rochester') ROWS As can be seen in Table 6, the improved modified SQL query can configure the modified SQL query to order the result set by "State, City" rather than by "State" as is used in the original SQL query. Thus, plural instances of the city "Rochester" can be grouped together and the StartAt clause can thereby present a first instance of a plurality of instances of the city "Rochester" where the plurality of instances of the city "Rochester" are grouped together as a result of the modified ORDER BY clause of the improved modified SQL query.

Numerous additional modifications and configurations can be used to improve a modified SQL query. For example, in some embodiments, an estimated size of a result set can be compared to an OFFSET value. In such embodiments, a processor (e.g., processor 205 of FIG. 2) can be configured to start at a terminal instance of a result set and scan toward an initial instance of the result set in order to expeditiously locate the offset criteria without scanning through the plurality of instances appearing prior to the offset criteria in the result set. For example, an offset criteria comprises a selection predicate criteria containing first name "Zach." The result set is ordered alphabetically by first name. The processor determines the first letter of the selection predicate criteria is contained at the end of the alphabet, and, therefore, begins searching for the selection predicate criteria from the terminal instance of the result set and toward the initial instance of the result set because the offset criteria is likely contained in the latter half of the result set.

In some embodiments, SQL optimization functions can be integrated into a modified SQL query. For example, an ALLIO sort clause can be added to a modified SQL query to improve the runtime of the modified SQL query. As is understood by one of skill in the art, in embodiments where an ALLIO sort clause is utilized, a processor (e.g., processor 205 of FIG. 2) can be configured to locate a relative record number (RRN) corresponding to an OFFSET value in a temporary table of the result set as opposed to using an index of the entire table.

In some embodiments, the modified SQL query can be improved such that the enhanced modified SQL query is configured to partition a result set generated by the modified SQL query and locate the offset criteria, and, optionally, the fetch criteria by searching respective partitions of the result set in parallel. In embodiments including a fetch criteria, the fetch criteria can be located in response to locating the offset criteria. The fetch criteria can be located in an instance subsequent to an instance containing the offset criteria and in a partition containing the instance containing the offset criteria or in partitions subsequent to the partition containing the instance containing the offset criteria. The fetch criteria can be searched for in parallel across a plurality of partitions.

In operation 450, the modified SQL query, or, in embodiments where operation 440 occurs, the improved modified SQL query, can be output. The output modified SQL query (or improved modified SQL query) can be temporarily or permanently stored in a computer readable storage medium (e.g., memory 225 or storage 230 of FIG. 2) and/or presented to a user interface (e.g., user device 104 of FIG. 1 or I/O devices 212 of FIG. 2). In operation 460, the method 400 can end.

Figure 5:
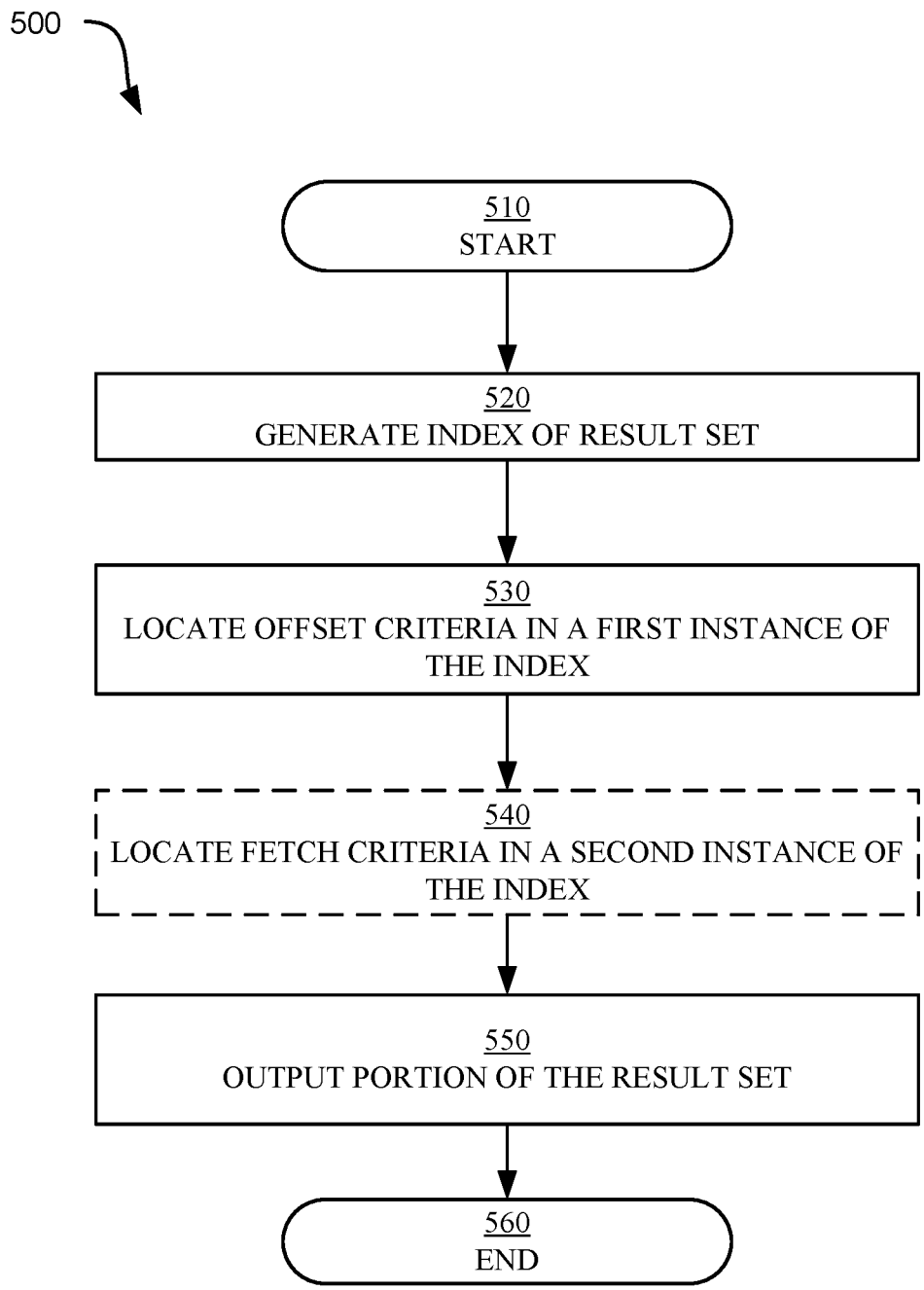
FIG. 5 illustrates a flowchart of an example method for outputting a portion of a result set in accordance with some embodiments of the present disclosure.

Referring now to FIG. 5, shown is a flowchart of an example method for outputting a portion of a result set in accordance with some embodiments of the present disclosure. The method 500 can be a sub-method of operation 350 of FIG. 3. The method 500 can be executed by one or more processors (e.g., processor 205 of FIG. 2) according to a set of instructions (e.g., instructions 260 of FIG. 2). In some embodiments, the method 500 can be implemented by a query manager in a network (e.g., query manager 106 connected to network 100 of FIG. 1).

The method 500 begins at operation 510. In operation 520, an index of a result set generated by a modified SQL query can be generated. The generated index can comprise a respective instance identifier for each respective instance of the result set and at least one respective value associated with each respective instance. In various embodiments, the generated index can include, but is not limited to, a bitmap index, a dense index, a sparse index, or a reverse index. As will be appreciated by one of skill in the art, numerous types of indices generated by numerous methods and techniques fall within the spirit and scope of the present disclosure.

In operation 530, the method 500 can locate the offset criteria in the generated index. The offset criteria can comprise a selection predicate criteria. Operation 530 can locate the offset criteria by searching respective values associated with respective instances in the index for a respective value matching the offset criteria.

In operation 540 (indicated as optional via the dashed box), the method 500 can locate a fetch criteria appearing after the offset criteria in the generated index. The fetch criteria can comprise a selection predicate criteria. Operation 540 can locate the fetch criteria by searching respective values associated with respective instances in the index for a respective value matching the fetch criteria.

In operation 550 the portion of the result set is output. Operation 550 can, in some embodiments, comprise presenting an instance identifier corresponding to the value matching the offset criteria, and, in some embodiments, an instance identifier corresponding to the value matching the fetch criteria. In some embodiments, operation 550 comprises outputting an instance identified in operation 530, an instance identified in operation 540, and each respective instance located between the instance identified in operation 530 and the instance identified in operation 540. In operation 560, the method 500 can end.

Figure 6:
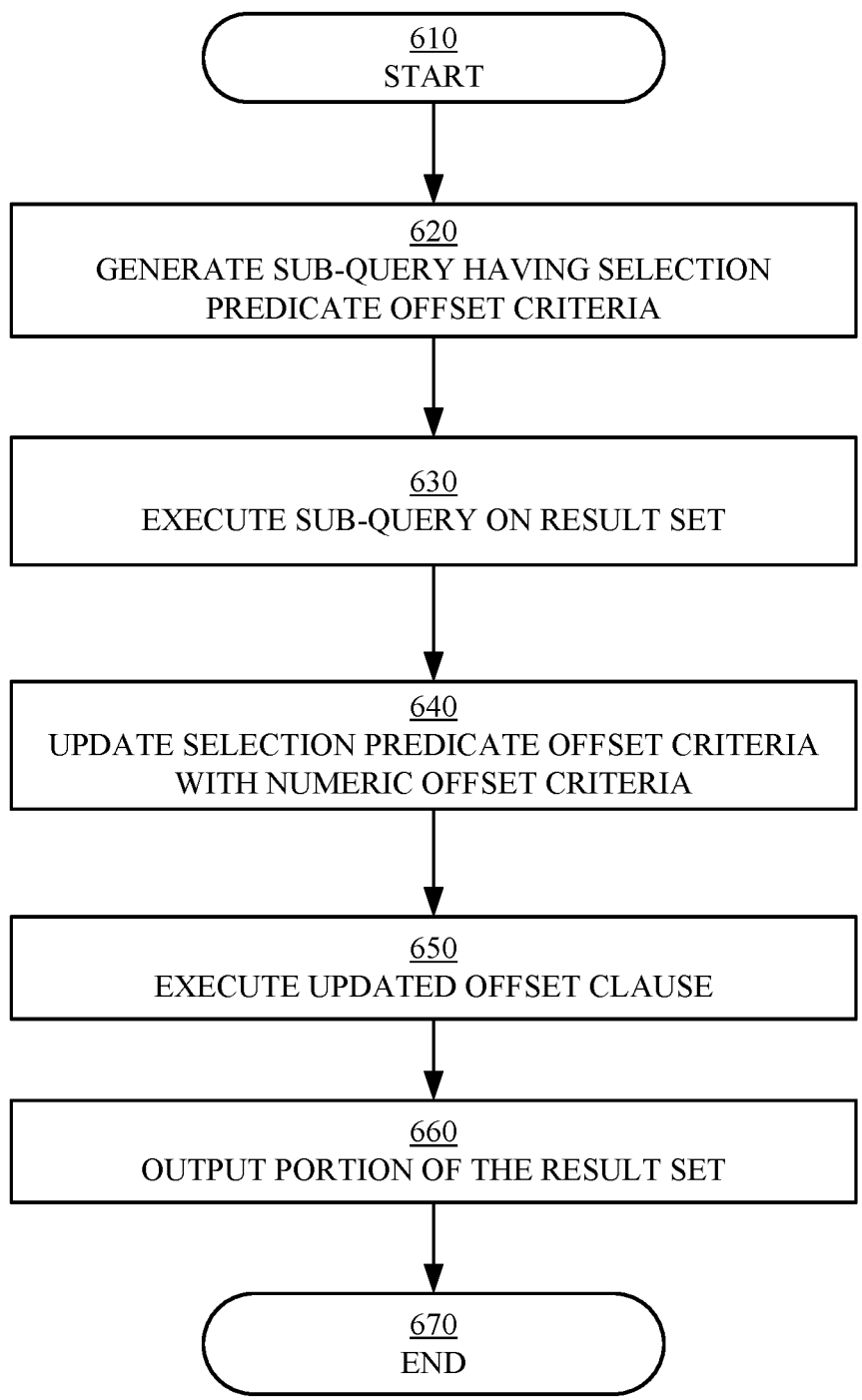
FIG. 6 illustrates a flowchart of another example method for outputting a portion of a result set in accordance with some embodiments of the present disclosure.

Referring now to FIG. 6, shown is a flowchart illustrating an example method for outputting a portion of a result set in accordance with some embodiments of the present disclosure. In some embodiments, the method 600 is a sub-method of operation 350 of FIG. 3. The method 600 can be executed by one or more processors (e.g., processor 205 of FIG. 2) executing a set of instructions (e.g., instructions 260 of FIG. 2). In some embodiments, the method 600 can be implemented by a query manager in a network (e.g., query manager 106 connected to network 100 of FIG. 1).

The method 600 can begin at operation 610. In operation 620, a processor executing the method 600 generates a sub-query containing offset criteria comprising a selection predicate criteria. The sub-query can be configured to locate a respective instance of a result set matching the offset criteria. In some embodiments, the processor further generates a second sub-query containing fetch criteria comprising a selection predicate criteria configured to locate a respective instance of the result set matching the fetch criteria.

In operation 630, the processor executes the one or more sub-queries generated in operation 620 on the result set such that a respective instance of the result set is returned in response to each respective sub-query. In operation 640, the processor updates the OFFSET clause such that the selection predicate offset criteria is replaced with an updated numeric offset criteria corresponding to the instance matching the selection predicate offset criteria contained in the sub-query. In embodiments including a second sub-query, the processor updates the FETCH clause such that the selection predicate fetch criteria is replaced with an updated numeric fetch criteria corresponding to the instance matching the selection predicate fetch criteria contained in the second sub-query.

In operation 650, the updated OFFSET clause, and, in some embodiments, the updated FETCH clause, are executed such that a result set is retrieved. In operation 660, the portion of the result set is output and/or presented based on the updated numeric offset criteria and, optionally, the updated numeric fetch criteria. In operation 670, the method 600 can end.

Figures 7A, 7B:
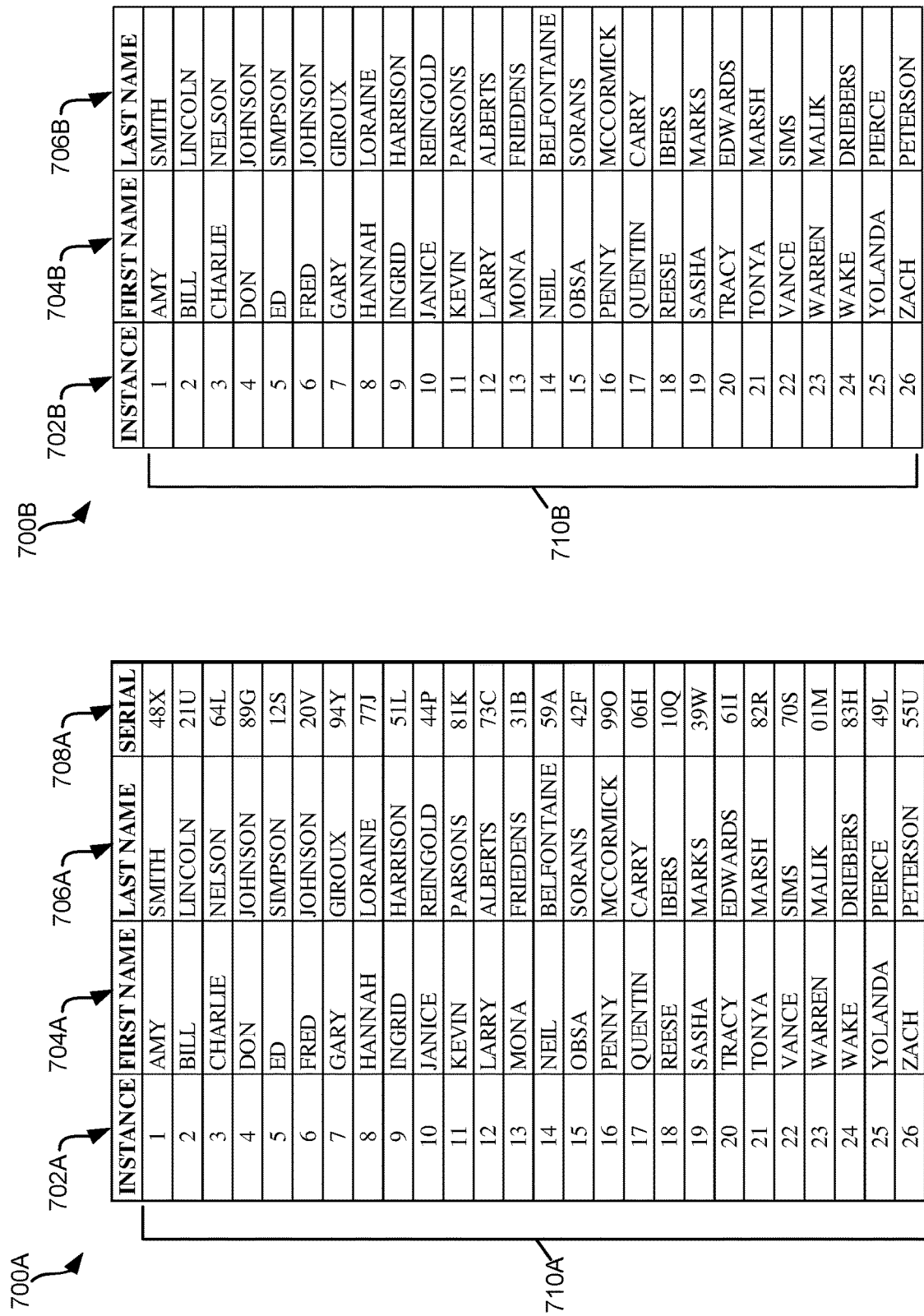
FIG. 7A illustrates a table of an example database in accordance with some embodiments of the present disclosure.
FIG. 7B illustrates a table of an example result set retrieved from the database illustrated in FIG. 7A in accordance with some embodiments of the present disclosure.

Referring now to FIG. 7A, illustrated is a table of an example database on which a SQL query can be executed. The example database 700A contains, for each instance of the plurality of instances 710A, an instance identifier 702A, a first name 704A, a last name 706A, and a serial number 708A. Database 700A is provided for example purposes and databases having more or fewer instances storing more or fewer values of similar or dissimilar nature and/or format are within the spirit and scope of the present disclosure. The data contained in example database 700A is fictitious data for the purposes of explaining aspects of the present disclosure.

Referring now to FIG. 7B, illustrated is a table of an example result set. Result set 700B can be generated by executing a SQL query on database 700A. Result set 700B contains, for each instance of the plurality of instances 710B, an instance identifier 702B, a first name 704B, and a last name 706B. Serial number 708A from database 700A is not represented in result set 700B because the serial number 708A is not part of the SQL query used to retrieve the result set 700B according to this example.

Referring now to FIG. 7C, illustrated is a table of an example portion of the result set based on a selection predicate criteria. The portion of the result set 700C contains, for each instance 710C, an instance identifier 702C, a first name 704C, and a last name 706C. The portion of the result set 700C can be generated by executing a modified SQL query such as, for example, the modified SQL query presented with respect to Table 2. The portion of the result set 700C can have an initial instance corresponding to a first appearance of the last name "Johnson" in the result set 700B as specified by a selection predicate offset criteria. Thus, the initial instance of the portion of the result set 700C corresponds to instance 4 of the result set 700B based on the first appearance of the last name Johnson in the result set 700B.

Referring now to FIG. 7D, illustrated is a table of an example portion of the result set based on a percentage criteria. The portion of the result set 700D contains, for each instance 710D, an instance identifier 702D, a first name 704D, and a last name 706D. The portion of the result set 700D can be generated by execution of a modified SQL query, such as, for example, the modified SQL query presented with respect to Table 3. The portion of the result set 700D can have an initial instance located at a specified percentile of the result set 700B. Thus, for a percentage criteria of 50%, the first presented result of the portion of the result set 700D is instance 13 of result set 700B since there are 26 instances in result set 700B and instance 13 corresponds to the $50^{th}$ percentile of the result set 700B. In some embodiments, the initial instance of the portion of the result set 700D is determined by multiplying the percentage criteria by a number of instances in the result set 700B.

Referring now to FIG. 7E, illustrated is a table of an example portion of the result set based on a UDF criteria. The portion of the result set 700E contains, for each instance 710E, an instance identifier 702E, a first name 704E, and a last name 706E. The portion of the result set 700E can be generated by execution of a modified SQL query such as, for example, the modified SQL query presented with respect to Table 4. The portion of the result set 700E can present an initial instance of the result set 700B based on a UDF criteria. For example, metadata contained in a user profile can define the UDF criteria such that the initial instance of the portion of the result set 700E occurs at instance 22 of the result set 700B.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
    modifying a structured query language (SQL) query to include an offset criteria comprising a first set of text;
    executing the modified SQL query to retrieve a result set comprising a first number of instances from a database; and
    outputting a portion of the result set having fewer instances than the first number of instances to a user interface based on the offset criteria and in response to executing the modified SQL query;
        wherein the portion of the result set comprises an initial instance, a terminal instance, and at least one instance of the result set located between the initial instance and the terminal instance; and
        wherein the initial instance of the portion of the result set contains a set of text matching the first set of text of the offset criteria.

2. The method of claim 1, wherein the first set of text is retrieved from metadata associated with a user profile that generated the SQL query.

3. The method of claim 1, further comprising:
    modifying the SQL query to include a fetch criteria comprising a second set of text; and
    wherein the terminal instance of the portion of the result set contains a set of text matching the second set of text of the fetch criteria.

4. The method of claim 3, wherein outputting a portion of the result set to a user interface further comprises:
    identifying, from the result set, an initial appearance of an instance associated with a value comprising a set of text matching the first set of text;
    determining the initial appearance of the instance associated with the value comprising the set of text matching the first set of text is an initial instance of the portion of the result set;
    identifying, from the result set, a terminal appearance of an instance associated with a value comprising a set of text matching the second set of text, wherein the terminal appearance is subsequent to the initial appearance; and
    determining the terminal appearance of the instance associated with the value comprising the set of text matching the second set of text is a terminal instance of the portion of the result set.

5. The method of claim 3, wherein executing the modified SQL query further comprises:
    partitioning the result set into a plurality of partitions;
    locating the first set of text in a first partition by simultaneously searching respective partitions for the first set of text; and
    locating the second set of text in a second partition subsequent to the first partition by simultaneously searching respective partitions for the second set of text in response to locating the first set of text.

6. The method of claim 5, further comprising:
    receiving a request for a second portion of the result set based on a new offset criteria and a new fetch criteria;
    locating an instance corresponding to the new offset criteria in a third partition by simultaneously searching respective partitions for the new offset criteria;
    locating an instance corresponding to the new fetch criteria by simultaneously searching respective partitions subsequent to the third partition for the new fetch criteria in response to locating the instance corresponding to the new offset criteria; and outputting the instance corresponding to the new offset criteria, the instance corresponding to the new fetch criteria, and each respective instance of the result set therebetween to the user interface.

7. The method of claim 1, wherein executing the modified SQL query further comprises:
creating an index of the result set comprising, for each respective instance in the result set, a respective instance identifier and at least one respective value;
locating an instance of the index having a value matching the first set of text; and
wherein outputting a portion of the result set further comprises:
presenting the instance of the index having a value matching the first set of text as the initial instance of the portion of the result set.

8. The method of claim 1, wherein executing the modified SQL query further comprises:
executing a sub-query on the result set configured to identify an instance of the result set matching the offset criteria;
identifying an instance of the result set matching the offset criteria; and
replacing the first set of text of the offset criteria with a number corresponding to the instance of the result set matching the offset criteria.

9. A system comprising:
a processor; and
a memory storing processor-executable instructions, wherein the processor is configured to execute the instructions to perform a method comprising:
modifying a structured query language (SQL) query to include an offset criteria comprising a first set of text;
executing the modified SQL query to retrieve a result set comprising a first number of instances from a database; and
outputting a portion of the result set having fewer instances than the first number of instances to a user interface based on the offset criteria and in response to executing the modified SQL query;
wherein the portion of the result set comprises an initial instance, a terminal instance, and at least one instance of the result set located between the initial instance and the terminal instance; and
wherein the initial instance of the portion of the result set contains a set of text matching the first set of text of the offset criteria.

10. The system of claim 9, wherein the first set of text is retrieved from metadata associated with a user profile that generated the SQL query.

11. The system of claim 9, further comprising:
modifying the SQL query to include a fetch criteria comprising a second set of text; and
wherein the terminal instance of the portion of the result set contains a set of text matching the second set of text of the fetch criteria.

12. The system of claim 11, wherein outputting a portion of the result set to a user interface further comprises:
identifying, from the result set, an initial appearance of an instance associated with a value comprising a set of text matching the first set of text;
determining the initial appearance of the instance associated with the value comprising the set of text matching the first set of text is an initial instance of the portion of the result set;
identifying, from the result set, a terminal appearance of an instance associated with a value comprising a set of text matching the second set of text, wherein the terminal appearance is subsequent to the initial appearance; and
determining the terminal appearance of the instance associated with the value comprising the set of text matching the second set of text is a terminal instance of the portion of the result set.

13. The system of claim 11, wherein executing the modified SQL query further comprises:
partitioning the result set into a plurality of partitions;
locating the first set of text in a first partition by simultaneously searching respective partitions for the first set of text; and
locating the second set of text in a second partition subsequent to the first partition by simultaneously searching respective partitions for the second set of text in response to locating the first set of text.

14. The system of claim 13, further comprising:
receiving a request for a second portion of the result set based on a new offset criteria and a new fetch criteria;
locating an instance corresponding to the new offset criteria in a third partition by simultaneously searching respective partitions for the new offset criteria;
locating an instance corresponding to the new fetch criteria by simultaneously searching respective partitions subsequent to the third partition for the new fetch criteria in response to locating the instance corresponding to the new offset criteria; and
outputting the instance corresponding to the new offset criteria, the instance corresponding to the new fetch criteria, and each respective instance of the result set therebetween to the user interface.

15. The system of claim 9, wherein executing the modified SQL query further comprises:
creating an index of the result set comprising, for each respective instance in the result set, a respective instance identifier and at least one respective value;
locating an instance of the index having a value matching the first set of text; and
wherein outputting a portion of the result set further comprises:
presenting the instance of the index having a value matching the first set of text as the initial instance of the portion of the result set.

16. The system of claim 9, wherein executing the modified SQL query further comprises:
executing a sub-query on the result set configured to identify an instance of the result set matching the offset criteria;
identifying an instance of the result set matching the offset criteria; and
replacing the first set of text of the offset criteria with a number corresponding to the instance of the result set matching the offset criteria.

17. A computer program product comprising a computer readable storage medium having program instructions embodied therewith, wherein the computer readable storage medium is not a transitory signal per se, the program instructions executable by a processor to cause the processor to perform a method comprising:
modifying a structured query language (SQL) query to include an offset criteria comprising a first set of text;
executingthe modified SQL queryto retrieve a result set comprising a first number of instances from a database; and outputting a portion of the result set having fewer instances than the first number of instances to a user interface based on the offset criteria and in response to executing the modified SQL query;

wherein the portion of the result set comprises an initial instance, a terminal instance, and at least one instance of the result set located between the initial instance and the terminal instance; and wherein the initial instance of the portion of the result set contains a set of text matching the first set of text of the offset criteria.

18. The computer program product of claim 17, wherein the first set of text is retrieved from metadata associated with a user profile that generated the SQL query.

19. The computer program product of claim 17, further comprising:

modifying the SQL query to include a fetch criteria comprising a second set of text; and wherein the terminal instance of the portion of the result set contains a set of text matching the second set of text of the fetch criteria.

20. The computer program product of claim 19, wherein outputting a portion of the result set to a user interface further comprises:

identifying, from the result set, an initial appearance of an instance associated with a value comprising a set of text matching the first set of text;

determining the initial appearance of the instance associated with the value comprising the set of text matching the first set of text is an initial instance of the portion of the result set;

identifying, from the result set, a terminal appearance of an instance associated with a value comprising a set of text matching the second set of text, wherein the terminal appearance is subsequent to the initial appearance; and determining the terminal appearance of the instance associated with the value comprising the set of text matching the second set of text is a terminal instance of the portion of the result set.

\* \* \* \* \*